Sept. 11, 1956 B. J. ROTHLEIN 2,762,957

HIGH CONDUCTION DIODE

Filed July 15, 1950

INVENTOR
BERNARD J. ROTHLEIN
BY Paul S. Martin
ATTORNEY 2,762,957
Patented Sept. 11, 1956

2,762,957

HIGH CONDUCTION DIODE

Bernard J. Rothlein, Queens Village, N. Y., assignor to Sylvania Electric Products Inc., a corporation of Massachusetts Application July 15, 1950, Serial No. 174,069
12 Claims. (Cl. 317—236)

The present invention relates to semiconductor rectifiers and to methods of manufacturing such rectifiers. In another aspect the invention is concerned with semiconductor devices whose primary purpose may not be rectification per se.

Semiconductor rectifiers have heretofore been divided into two categories, termed "plate rectifiers" and "point-contact rectifiers," to convey the different concepts of large area as against limited area of rectifying contact. The plate rectifiers have generally been used for power rectification purposes with the thought that the large area enables the device to carry relatively heavy rectified current without destructive internal generation of heat. Cuprous oxide and selenium plate rectifiers are in this class. In the other category where only small currents are to be handled as in the detection of radio signals, a wide variety of whisker-type rectifiers types are known, including galena, silicon and germanium. In this class, low capacitance is a prime requisite for performance at high frequencies. Additionally, a sharp break in the rectifying characteristic at very low voltage is important.

The amount of current that a rectifier will pass in the forward direction is limited by the ability of the unit to withstand high temperatures resulting from internal power loss. It follows that so-called point-contact rectifiers, rectifiers of the whisker type, could be capable of use in high-current applications, provided that the internal loss could be reduced to an extremely low order, and provided further that the unit could withstand the elevated temperature caused by its internal power consumption.

Broadly, an object of the invention is to provide a new and improved semiconductor translator. In one aspect of the invention there is provided a novel high-efficiency, low-resistance, high-current and high-current density semiconductor device, and a rectifier having such characteristics. By way of illustration, a commercial point-contact germanium rectifier has specifications requiring that it pass at least 5 milliamperes in the forward direction with one volt applied and in the reverse direction pass no more than 50 microamperes at 10 volts; whereas, specimens of rectifiers embodying aspects of the present invention have passed 100 to 150 milliamperes in the forward direction at 1 volt, with 50 microamperes in the reverse direction at 10 volts. In the forward direction in the 1 volt region, a range of dynamic resistances of 3–15 ohms has been realized with the new rectifiers of the present invention in comparison to a dynamic resistance of approximately 80 ohms at 1 volt for the above-mentioned commercial point-contact rectifiers. It is thus apparent that an outstanding advantage of the present invention in semiconductor devices is that high-current carrying capacity is accompanied by low internal loss, i. e., high efficiency.

In another aspect the present invention provides a rectifying contact wherein the break between the high back resistance portion of its characteristic and the low forward resistance portion of its characteristic occurs abruptly at a low voltage which enables efficient detection of low-voltage signals. This characteristic is recognized from the low dynamic resistance of the element for low applied voltage, as indicated above. The present invention also makes possible the further features of higher operating frequencies, and reduced noise levels in high frequency applications.

While in performance the devices made in accordance with this invention have the high-current characteristics resembling somewhat those of the plate-rectifier category, the presently preferred embodiments also have the desirable operating characteristics of point-contact rectifiers and will be described, without limitation, using terminology common in that art.

The nature of the invention and its various features and aspects will be better appreciated from the following illustrative disclosure, but it will be obvious to those skilled in the art that varied application and varied detail will be suggested by this disclosure. In the illustrative embodiments, pulverulent conductive materials of microscopic particle size, including graphite, semiconductive materials or metal, are used in the contact to the semiconductor body. The term "conductive" as applied to the pulverulent material in this specification and the appended claims is intended to include substances normally regarded as semiconductors, as well as those metals known for high electrical conductivity. Where such conductive powder is used in conjunction with a whisker or wire, the end of which is arranged to apply pressure, high current-capacity and high rectification efficiency are realized.

Figure 1:
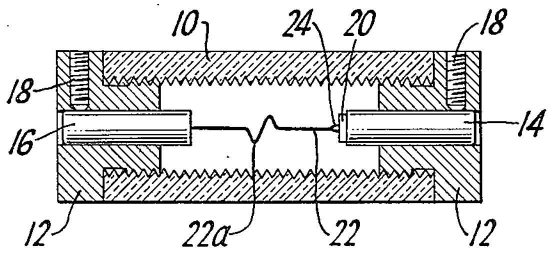
Fig. 1 is an enlarged cross-section of a diode embodying the invention.

An illustrative diode is shown in Fig. 1 having a structure typical of prior point-contact rectifiers except for a modification in the contact region. The device includes an internally threaded ceramic tube 10 having metal end fittings 12 for adjustably receiving pins 14 and 16, set screws 18 serving to lock these pins in adjusted position. A thin flat body 20 of germanium is physically and electrically connected to pin 14 in a large-area contact, and a tungsten whisker 22 formed with a resilient portion **22*a* is conveniently welded to pin 16**, and applies pressure to the germanium. The opposed surfaces of the whisker and the germanium or other semiconductor, as well as the area of semiconductor immediately adjacent to the opposed surfaces, is termed the "contact region."

A quantity of pulverulent conductor 24 intimately engages the semiconductor and the whisker in this contact region. Aquadag, a finely divided suspension of graphite in water, has been found to increase the current carrying capacity and conductivity of the whisker-contact type of rectifiers, but metal dust or powder so used, including silver, tungsten, zinc and platinum, separately or as a mixture, impart a high order of forward conductivity that is invaluable in certain circuit applications. Moreover, these powders do not significantly increase the back conductivity as compared to like units which use no such powder. Semiconductors in finely divided state, including silicon and germanium, are also effective in substantially increasing conductivity.

Semiconductor body 20 advantageously is of tin-doped germanium prepared by melting purified germanium powder together with 1% of tin in a prolonged melting and cooling cycle, being a so-called *n*-type semiconductor at the end of this process. The resulting ingot is sliced with a diamond wheel and the slices are polished and etched in accordance with common techniques, then divided into small chips or "dice," and soldered or otherwise attached to a conductive support of relatively large area.

Figure 2:
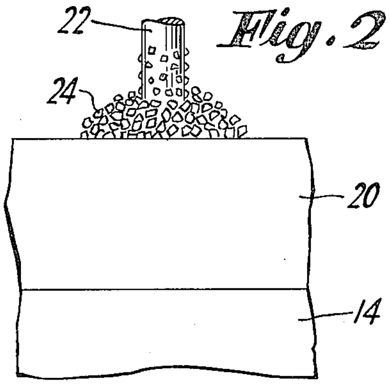
Fig. 2 is a greatly enlarged view of a detail thereof.

The contact region of the device in Fig. 1 is shown on a highly magnified scale in Fig. 2, where the end of whisker 22 is resiliently pressed toward germanium body 20. Over a portion of its length and over its end, whisker 22 is coated with suitable conductive particles, covering the germanium in the contact region and also extending along the semiconductor surface for some distance away from the contact region and beyond what is normally considered the contact region.

Whisker 22 can be formed with a carefully ground conical point; but a comparatively blunt point appears to yield superior results. A whisker of .005 inch diameter tungsten wire simply cut with a pair of wire scissors and applied with the interposed powder yields a rectifying contact of higher current carrying capacity than a carefully formed conical point used with powder. Also it is quite feasible to take a sheared tungsten wire as of .009 inch diameter and, with no resilient portion **22*a*** and vastly increased total pressure in the contact region, obtain a high forward current of the order of 125 milliamperes.

In one illustrative procedure, the structure of Fig. 2 is completed by painting the contact end of the whisker with a suspension or paste of pulverulent silver of apparent particle size .002 inch or finer (microscopically estimated); or of tungsten of 2 micron average size in a vehicle of burgundy pitch and spike-oil, then contacting the germanium with this coated whisker under optimum pressure, and electrically forming the unit as with a fractional-second burst of alternating current of about one-half ampere or long pulses of less current. Following this treatment, the assembled unit is boiled and agitated for removal of excess metal powder and vehicle or binder, as in acetone, ethylene di-chloride, a detergent, or distilled water, or combinations of these used together or successively. Baking, for driving off fluids left by washing or originally in the metal-particle suspension, completes the unit. The washing process frequently reduces the amount of powder in the contact region substantially beyond the state shown in Fig. 2.

The foregoing operations are not critical in all respects. Thus, it is entirely practical to omit the washing step in making rectifiers for some purposes. The excess of metal powder, though forming a conductive mass in the cases of silver and platinum paste or paint, appears to have little effect on the diode rectifying characteristics of the device. However, the excess powder may contribute unnecessary capacitance, impairing high-frequency performance. Rather than to apply the powder in its vehicle to the whisker, a small area of the semiconductor can be coated. The uncoated whisker is then brought into engagement with the coating and pressure is built up. Whether there is direct contact of the whisker and the semiconductor has not been ascertained, but evidently the conductive particles are squeezed between the whisker and the semiconductor surface under vast unit-area pressure. No certain explanation has been found for the remarkable change in characteristics of rectifiers made with the conductive powder as compared to the same device made without the powder.

Irrespective of whether the whisker or the semiconductor is initially coated, a rectifying contact of high conductivity and high-current carrying capacity is obtained as soon as the proper pressure is established. This is realized by gradually increasing the pressure while the forward current is measured with constant alternating-current voltage or direct-current voltage polarized for forward conduction. The pressure is increased until the current no longer rises with increasing pressure but gives signs of diminishing. As high as 150 milliamperes at 1 volt will flow when pressure contact is first properly established. At this stage the current in the reverse direction at one volt is ordinarily about one-tenth of a milliampere. The electrical forming mentioned above then reduces the reverse conductivity at 1 volt to a range of 5 to 20 microamperes without affecting the forward conductivity appreciably.

The construction and processing and the resultant electrical characteristics are similar with the various metal powders hereinabove mentioned and used in a suitable organic binder, and the metal powder applied in a water vehicle and even applied dry is operative. The role of the vehicle appears to be mainly for easy application of the metal powder and for insuring intimate contact of the whisker and the semiconductor. Binders appropriate to resist the heat developed in the contact region both during forming and during operation may be desirable for the purpose of protecting the materials in the contact region against atmospheric deterioration. The pulverulent material adheres to the semiconductor body after completion, and it is often possible to pull the whisker away from the semiconductor and restore it or another whisker to the original contact region without substantial change of characteristic.

Figure 3:
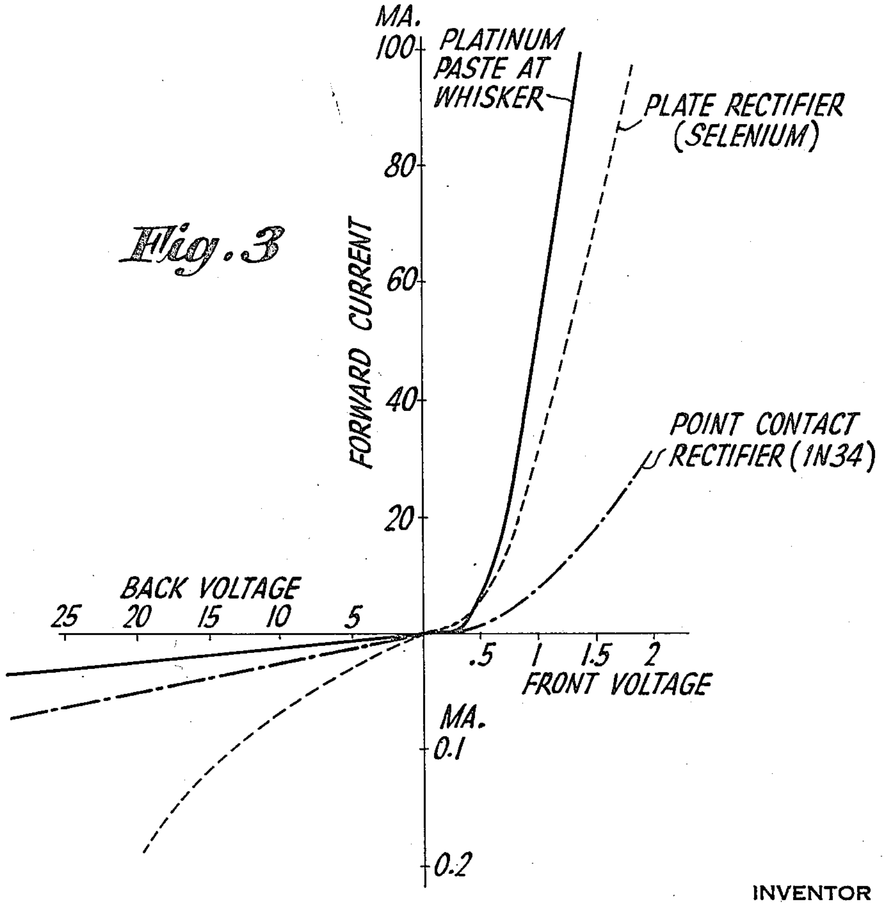
Fig. 3 is a comparative graph showing the current-voltage characteristics of typical known plate and point-contact rectifiers, together with that of an improved embodiment.

In Fig. 3 the comparative operating characteristics of two commercial types of rectifiers are shown together with a rectifier of the construction in Fig. 1 improved with the addition of platinum paste, having a sheared tungsten whisker and a body of tin-doped germanium and processed as described above.

The forward conductivity of the selenium plate rectifier is seen from the dotted-line curve to be of a relatively high order but it will be recalled that being a plate rectifier, its electrical capacitance is such as to make it unsuited for detection of high frequency signals. Also, its leakage current in the reverse direction is comparatively poor. A point-contact germanium rectifier type 1N34 whose characteristic is shown in dot-dash lines has a much lower leakage current than the selenium rectifier and it has the low capacitance essential to high frequency operation, but the forward conductivity is relatively low.

Compared to both these commercial types of rectifiers the novel rectifier employing platinum paste has a substantially increased order of forward conductivity and current carrying capacity (see the solid-line curve) and at the same time has reduced leakage in the back direction. With slight changes in whisker form and with other metal pastes it is possible to increase the forward current substantially beyond that shown in Fig. 3 but at the expense of some increase in leakage current.

The frequency of operation of a commercial line of germanium rectifiers (exemplified by the 1N34) as heterodyne detectors is in practice limited to approximately 600 megacycles per second. In contrast, units of identical construction modified in accordance with the foregoing illustrative procedure have been found to be operative at least as high as 1,000 megacycles per second. Moreover, a substantial increase in the signal-to-noise ratio is attained in the high frequency operation of germanium rectifiers in which metal powder is used as described.

A remarkable improvement in the characteristics of semiconductor translators is made possible through this invention, and because a latitude of modification and varied application will occur to those skilled in the art, it is appropriate that the appended claims be accorded a broad scope of interpretation as is consistent with the spirit of the invention.

What I claim is:

1. A rectifier including a body of *n*-type germanium, a wire and a quantity of metal particles confined under pressure between at least part of the end surface of the wire and the germanium.

2. The method of making a rectifying contact which includes the steps of interposing a quantity of powdered conductive material between a wire and a semiconductor body while mutually separated, and then pressing the wire endwise toward the semiconductor with the powdered conductive material interposed.

3. An electrical device including a rectifying contact having a wire and a body of semiconductor with the rectifying contact formed by pressing the wire toward the semiconductor with a quantity of metal powder interposed before pressure is applied.

4. The method of making rectifying contacts which includes the steps of coating the end of a whisker with a suspension of conductive comminuted material of microscopic particle size in a vehicle, applying the coated whisker to the surface of a body of germanium, applying a voltage between the whisker and the germanium so as to pass current in the forward direction, and gradually increasing the applied pressure until the forward current no longer rises with increasing pressure.

5. The method of making rectifying contacts which includes the steps of assembling a whisker and a semiconductor body with an interposed mass of conductive powder, applying pressure to the whisker up to a maximum limit determined by maximum forward conductivity of the contact, and removing excess metal powder from the contact region.

6. The method of making rectifying contacts which includes the steps of assembling a whisker and a semiconductor body with an interposed mass of conductive powder, and applying pressure to the whisker up to a maximum limit determined by maximum forward conductivity of the contact.

7. An electrical device including a rectifying contact having a body of crystalline germanium, a wire contact pressed endwise toward the germanium with a quantity of conductive paste interposed between the wire contact and the germanium, said paste having conductive particles in a vehicle, the wire being of the order of .005 inch diameter and the particle size being a small part of that dimension.

8. An electrical device including a rectifying contact having a wire pressed endwise toward a body of semiconductor with a modicum of conductive paint interposed between the end of the wire and the semiconductor, the pressure being adjusted for maximum forward conductivity and the rectifying contact being formed for minimum electrical leakage.

9. An electrical device including a rectifying contact having a wire pressed endwise toward the body of semiconductor with a modicum of conductive paint interposed between the end of the wire and the semiconductor.

10. A rectifier including a body of semiconductive material and a rectifying point-contact thereto including comminuted metal in the immediate region of the semiconductive material and the rectifying point-contact.

11. A rectifier including a body of semiconductive germanium, a wire pressed endwise toward the body and conductive particles interposed between the germanium and the wire.

12. A rectifier including a body of semiconductive germanium, a large contact thereto, a wire contact pressed endwise toward the germanium and a modicum of conductive dust engaging said body and said contact wire.

References Cited in the file of this patent

UNITED STATES PATENTS

| | | |
|---|---|---|
| 794,459 | Hogg | July 11, 1905 |
| 1,908,316 | Bush | May 9, 1933 |
| 2,161,600 | Van Geel | June 6, 1939 |
| 2,583,008 | Olsen | Jan. 22, 1952 |

FOREIGN PATENTS

| | | |
|---|---|---|
| 518,421 | Germany | Oct. 3, 1931 |